(12) United States Patent
Garcia et al.

(10) Patent No.: US 8,104,447 B2
(45) Date of Patent: Jan. 31, 2012

(54) METHOD FOR THE PRODUCTION OF A PISTON FOR INTERNAL COMBUSTION ENGINES AND PISTON FOR AN INTERNAL COMBUSTION ENGINE

(75) Inventors: Joao Lester Garcia, Junidiaí (BR); Heraldo Carlos Furquim, Junidiaí (BR)

(73) Assignee: ThyssenKrupp Metalurgica Campo Limpo Ltda., Sao Paulo (BR)

( * ) Notice: Subject to any disclaimer, the term of this patent is extended or adjusted under 35 U.S.C. 154(b) by 419 days.

(21) Appl. No.: 12/442,645

(22) PCT Filed: Sep. 25, 2007

(86) PCT No.: PCT/EP2007/060158
§ 371 (c)(1),
(2), (4) Date: Jul. 14, 2009

(87) PCT Pub. No.: WO2008/037711
PCT Pub. Date: Apr. 3, 2008

(65) Prior Publication Data
US 2011/0083633 A9    Apr. 14, 2011

(30) Foreign Application Priority Data
Sep. 26, 2006  (EP) .................................... 06121267

(51) Int. Cl.
*F02F 3/00*    (2006.01)
(52) U.S. Cl. ................................. 123/193.6; 29/888.042
(58) Field of Classification Search ............... 123/193.6; 92/255, 212; 29/888.042; 72/253, 264
See application file for complete search history.

(56) References Cited

U.S. PATENT DOCUMENTS

| | | | |
|---|---|---|---|
| 3,075,817 A | 1/1963 | Mayes | 309/14 |
| 3,166,993 A * | 1/1965 | Blenkle | 92/181 R |
| 4,364,159 A | 12/1982 | Holcombe | 29/156.5 |
| 5,174,193 A * | 12/1992 | Parker et al. | 92/212 |
| 6,691,666 B1 | 2/2004 | Berr et al. | 123/193.6 |
| 2007/0295299 A1* | 12/2007 | Lapp et al. | 123/193.6 |
| 2008/0134880 A1* | 6/2008 | Lapp et al. | 92/255 |

FOREIGN PATENT DOCUMENTS

| | | |
|---|---|---|
| DE | 725 761 | 9/1942 |
| DE | 102 44 513 | 4/2004 |
| GB | 2 080 485 | 2/1982 |
| JP | 54-21945 | 2/1979 |
| JP | 3-267552 | 11/1991 |

OTHER PUBLICATIONS

International Search Report for International Application No. PCT/EP2007/060158.

* cited by examiner

*Primary Examiner* — M. McMahon
(74) *Attorney, Agent, or Firm* — Proskauer Rose LLP

(57) ABSTRACT

A method for producing a piston for internal combustion engines includes the following steps: a first part is pre-fabricated by hot forging and a recess which has an undercut is formed in the first part during pre-fabrication by forming on the first part a projection, to which projection a lateral force is applied to form the undercut; a second part is pre-fabricated by hot forging and a projection is formed on this second part whose dimensions are matched to the dimensions of the recess; the two parts are joined together so that the projection on one part engages in the recess in the other part; and a compressive force is applied to the two parts which is sufficiently large and so aligned that the material of the projection on one part flows into the recess in the other part and completely fills it to connect the parts by positive fit.

19 Claims, 3 Drawing Sheets

METHOD FOR THE PRODUCTION OF A PISTON FOR INTERNAL COMBUSTION ENGINES AND PISTON FOR AN INTERNAL COMBUSTION ENGINE

CROSS-REFERENCE TO RELATED APPLICATIONS

This application is a National Phase Application of International Application No. PCT/EP2007/060158, filed on Sep. 25, 2007, which claims the benefit of and priority to European patent application no. EP 06 121 267.6, filed on Sep. 26, 2006. The disclosures of the above applications are incorporated herein by reference in their entirety.

FIELD OF THE INVENTION

The invention relates to a method of producing a piston for internal combustion engines from two pre-fabricated parts which, having been pre-fabricated, are connected together to form the piston. As well as this, the invention also relates to a piston which is produced in a corresponding manner from two parts.

BACKGROUND

Pistons for internal combustion engines are usually produced by casting or forging processes. Production by casting has the advantage that it allows pistons of complex shape and low weight to be produced. However, what has to be accepted at the same time is that the production involves considerable cost and complication. This is particularly true when a steel material is to be used as the material for producing pistons able to withstand especially high stresses.

Depending on their size and intended purpose, forged steel pistons may both be of a one-piece form and may also be composed of two or more parts. In the case of multi-piece pistons assembled from two or more parts, the individual parts are usually connected together, by suitable joining processes, by friction, bonding, or positive fit in such a way that they will withstand the forces acting on them in practical use. What is suitable for this purpose is for example welding or screwing together of the separate parts of the piston.

An example of a multi-piece piston for an internal combustion engine is known from DE 102 44 513 A1. This piston has, on the one hand, a head part which is forged from steel and integrally formed in which are formed dishing for the combustion chamber, an annular wall and a cooling passage in the form of a groove. On the other hand the piston has a skirt part which carries the head part of the piston and in which are formed bosses to receive a piston pin which connects the piston to the connecting rod. To produce this piston, the head part and skirt part of the piston are pre-shaped by forging in separate operations and are then machined by stock-removing machining to finish them. The finish machining of the head part of the piston also includes in this case the stock-removing machining of the portions of wall adjoining the cooling passage, by means of which portions of wall a joint is then made to the skirt part of the piston by physical union by welding or brazing.

It is true that multi-piece construction of this kind allows the piston which is formed from the two parts to be made of a complex shape. However, apart from the problems relating to load-bearing capacity which arise from its multi-piece nature, the cost and complication its production involves are considerable.

Disadvantages of the production of one-piece pistons are the high weight of the blank for the piston, as a result of which processing and handling equipment of particularly large dimensions is required, and the expense involved in the mechanical post-processing which is inevitably required in present-day practice. Despite the advantages that one-piece pistons have, as far as their load-bearing capacity is concerned, the disadvantages mentioned mean that when production is conventional one-piece pistons can only be produced at increased production costs.

One possible way of connecting together, by forging, a piston formed from two previously manufactured parts is known from JP 03-267552 A. In this piece of prior art, a piston-skirt blank whose basic shape is that of a cylinder is produced by sintering a metal powder. A projection which is of a circular disc-like shape is produced on the end-face of the piston-skirt blank when this is done.

In addition to the skirt part of the piston, what is also produced by the known method is a head part of the piston which is likewise of a disc-like basic shape. The diameter of the skirt part of the piston corresponds to the diameter of the head part of the piston in this case. Formed in the end-face of the head part of the piston is a recess whose opening is so defined by an encircling portion which projects into the recess that an undercut is formed between the said portion and the floor area of the recess. To allow the skirt part and head part of the piston to be joined together, the head part of the piston is first placed in a die whose inside diameter corresponds to the outside diameter of the skirt part and head part of the piston. The recess in the head part of the piston faces towards the opening of the die while the said head part of the piston is supported at its other end-face by means of a punch. The piston-skirt blank is then introduced into the die until its projection is seated in the recess in the head part of the piston. The head part of the piston then has a forging force applied to it by means of a shaping punch, which force causes the material of the skirt part of the piston to flow into the recess in the head part of the piston and to fill the undercut which is formed in the latter. The skirt part of the piston is given its cup-like final configuration at the same time.

The piston which is produced by the method from JP 03-267552 A is of an outside shape which is, in essence, completely cylindrical. Formed in the circumferential surface of the skirt part of the piston in this case, closely adjacent to the head part of the piston which is carried by the skirt part of the piston, are grooves for piston rings. Neither the skirt part of the piston nor the head part of the piston have, in this case, any additional configurational features which would make them suitable for a modern-day internal combustion engine. In particular, the known piston does not have any special shaping of the head part of the piston of the kind which is nowadays required if optimum use is to be made of the energy from the fuel which is burnt in the given internal combustion engine. It is also found that simple designs of piston of the kind described in JP 03-267552 A are not equal to the thermal demands which arise in modern-day internal combustion engines.

Comparable possible ways of producing pistons from two parts by means of a positive fit between the parts produced by forging are known from DE 725 761 C, JP 54-021945 A, GB 2 080 485 A or U.S. Pat. No. 3,075,817 A1. However, what all these pieces of prior art have in common is that the pistons which are assembled in a known manner from two parts are each of a simple shape which no longer meets the modern-day demands that are made of pistons for internal combustion engines.

SUMMARY OF THE INVENTION

Against the background of the prior art explained above, an aspect underlying the invention is therefore to provide a method which makes possible the inexpensive production even of pistons of complex shape for internal combustion engines. Another aspect is also to specify a piston for internal combustion engines which can be produced inexpensively with great accuracy of manufacture despite its being of complex shape.

In accordance with the invention, the connection between the two parts of the piston is made by means of a mechanical connection in which the material of the projection on one part is clamped by the material surrounding the recess in the other part in such a way that the two parts are indissolubly connected together. For this purpose, there is formed in the region of the recess in one part an undercut which, on the two parts being compressed, is filled by the material of the projection which flows into it. There is formed in this way a mechanical locking system which operates in essence by positive inter-engagement and which ensures that the two parts of the piston produced in accordance with the invention are held solidly together in a durable way. A major advantage of the invention lies in this case in the fact that the individual parts from which the piston is assembled, which are composed of a steel material for example, can be preformed in a completely finished form and the connection between the parts can be made without any additional connecting members such as screws or bolts. The mechanical connection which is provided in accordance with the invention, which is made by material of the two parts interlocking by positive fit, makes it possible in this case for the at least two individual parts from which a piston according to the invention is assembled to be accurately pre-shaped. When they are put together to form the piston, they are therefore of a minimized weight, which means that only low forces have to be applied to handle the workpieces. What is more, due to the joining process according to the invention, there is no change in the basic shape of the piston and a consequence of this is that, at least as a rule, only a very much reduced amount of mechanical post-processing of the fully joined piston is utilized.

Something which proves to be particularly advantageous in this connection is that the way in which the two parts of the piston are connected in accordance with the invention makes it possible for the piston to be produced by hot-forging operations alone. In this way, as well as the two parts of the piston being pre-fabricated by hot forging, the undercut which is formed in one part may also be produced by hot-forging steps.

For this purpose, a projection is first formed on the first part by means of a shaping tool, which projection is directed substantially in the opposite direction from that in which the tool acts. A lateral force which is directed in the direction of the receptacle is then applied to this projection to form the undercut. When the undercut is produced in such a way in two stages, a projection which has no undercut and from which the forging tool can be separated again by a simple lifting movement is first formed on the first part by means of a suitable tool. Then, by the lateral application of force, the projection is sloped in the direction of the receptacle of the first part in such a way that the projection makes an angle of less than 90° between its free end and the bottom of the receptacle. Any additional stock-removing machining to make the undercut can be avoided in this way.

What is more, with the manner of production in accordance with the invention there is no longer any need for the parts of the pistons to be heated to their melting point locally. With a piston according to the invention there is likewise no longer any risk of changes in microstructure or of stresses arising in the piston which such heating involves.

Another significant aspect of the invention is that the at least two parts are connected together by a simple operation comparable to a forging step. The apparatus required for this purpose can be designed to be simple and hence inexpensive because a special die or comparable aids which determine the flow of the material and prevent the components from deforming are not required in the region of the connecting zone and instead the desired filling of the recess in one part of the piston by the material of the projection on the other part of the piston is ensured by the fact that the projection is plugged into the recess in the other part and the flow of material which then occurs when pressure is applied is determined by the shape of the recess itself.

The outcome is that the invention thus makes available a method which, in a simple and inexpensive way, makes it possible for pistons for internal combustion engines to be produced which are very accurately shaped and, at the same time, able to carry high stresses. Their configuration is selected in such a way in this case that they can be joined together from two parts with simple means without the need for expensive and complicated apparatus or excessively high forces. An embodiment of the invention which is particularly right for practical requirements is characterized in that the recess and the projection are formed at respective end-faces of the parts respectively associated with them. In this embodiment, all that is required to cause the desired flow of material is a compressive force acting in the direction of the longitudinal axis of the piston which is to be produced. At the same time, what is ensured in the case of this arrangement is a connection which is optimum with regard to the stresses which occur in practical use.

A particularly simple form for the parts of the piston and a variant of the method according to the invention which can be carried out in an equally simple way are obtained when one part forms the head of the piston to be produced and the other part forms the skirt thereof.

Basically, it is immaterial to the success of the invention which of the parts the projection and recess are respectively associated with. In this way, in cases where one part forms the piston skirt to which the given connecting rod is coupled in practical use and which guides the piston in the bore of the cylinder and where the other part forms the piston head in whose end-face remote from the piston skirt a dishing for the combustion chamber is usually formed, it is possible for the projection to be formed on the head part of the piston and the recess to be formed in the skirt part thereof. However, from the production point of view it has proved to be particularly practical for the projection to be associated with the skirt part of the piston and the recess with the head part thereof.

Something which also makes a contribution to simplifying that part of the piston which is provided with the recess in the course of previous manufacture is for the recess concerned to have a circular opening.

The undercut which is provided in accordance with the invention in the region of the recess can easily be produced by making the opening of the recess an area which is smaller than the projected floor area of the recess, which projected floor area is situated opposite the opening. With sizing of this kind, the area of the opening is always smaller than the floor area when the latter is projected into the plane of the area of the opening. What this means is that, when the floor area is seen in plan, at least a portion or portions of the edge of the opening are arranged to be offset from the edge of the floor area towards the center of the floor area, which means that an undercut is necessarily formed at the portions in question as the edge of the opening changes to the edge of the floor area. The undercut may be formed in this case by, starting from the floor area of the recess, aligning at least a portion or portions of the circumferential surface surrounding the recess to be inclined towards the area of the opening.

Basically, it is conceivable for the parts which together form the piston to be connected together by cold forming. However, a considerable simplification of the complication which this kind of forming involves can be achieved by, when force is applied to make the positive fit connection between the first and second parts, heating the part which is provided with the projection to forging temperature at least in the region of the projection. When this is the case, the first, cold, part acts, by means of its receptacle, as a die for the forming of the projection on the second part, which projection is inserted into the receptacle and is at forging temperature, which means that there is an assurance of even and complete filling of the undercut region of the receptacle by the material of the projection in the course of the deformation of the projection which occurs as a result of force being applied.

The support which one part of the fully assembled and joined piston has on its other part may be boosted by forming a shoulder at the transition from the projection to the main portion of the part associated with the projection. The other part is able to support itself on this shoulder at least by the wall which defines its recess.

Something that has proved particularly apt for practical requirements is an embodiment of the invention in which at least a portion or portions of the recess are defined by a freely projected collar portion. This collar portion on the one hand forms the shaping element by which the undercut which is filled with the material of the projection on the other part is formed in the region of the recess. On the other hand, the flow of material which occurs in the course of the application of pressure can be steered in such a way that the collar portion ensures that the two parts are clamped together reliably, securely and durably by engaging comparatively deeply into the material of the part of the piston which is provided with the projection and by virtue of the fact that the material of the part provided with the projection surrounds at least a portion or portions of the collar portion.

The security with which the two parts of the piston according to the invention are held together even under the heating-up which occurs in operation can be optimized, while at the same time not changing the simple assembly process, by making the volume of the projection on one part of a size such that, taking into account the thermal expansion of the two parts, the material of the projection completely fills the recess in the other part even in the cooled-down state. For this purpose the shape of the circumference of the projection on one part may be matched to the shape of the opening of the recess in the other part in such a way that the projection is able to be slid into the opening when it is in the state where it is heated to hot-forging temperature, and in such a way that the height of the projection is greater than the depth of the recess.

A significant advantage of the invention lies in the fact that the manner in accordance with the invention of producing a piston allows the respective materials which are selected for the two parts from which the piston is assembled to be ones which are optimally matched to the stresses which act on the respective parts in operation. In this way, the invention makes it possible, when selecting the respective materials, for allowance to be made not only for the respective mechanical stresses but also for stresses which arise as a result of, for example, thermal or chemical effects to which a piston according to the invention is exposed in practical use.

It is therefore proposed in a particularly advantageous embodiment of the invention that one part of a piston according to the invention be manufactured from a first material and that the other part be manufactured from a second material which is different from the first material. As a function of the particular area of use, the first part for example may therefore be previously manufactured from steel of a first grade and the second part from steel of a second grade, or the first part from a grade of steel and the second part from another metallic material and in particular a light metal, or the first part from a ceramic and the second part from a metallic material. As well as hot forging being used as a method of previous manufacture for forgeable materials, previous manufacture by sintering may also be used in accordance with the invention at least for the head part of the piston. The starting material for the head part of the piston is then powdered metal for sintering.

The invention also allows the individual parts from which a piston is assembled in the manner according to the invention to be differently heat-treated or differently treated in some other way to allow for the stresses which act on the respective parts in practice.

The production and configuring in accordance with the invention of a piston for internal combustion engines thus provides a wide range of possible means of optimization which allow pistons of this kind each to be matched to their respective intended uses in the optimum way.

The piston according to the invention is so designed that, while being able to be produced easily, it meets the demands made of modern-day pistons. In this way, it is assembled from two parts produced by hot forging which are connected together by positive fit. At the same time however, in the region of the transition between the head of the piston and the skirt of the piston, an encircling free space which is known per se by means of which the heat which arises in practical use is dissipated in terms of a cooling passage. To achieve this, there is formed, in accordance with the invention, on one part a receptacle which is surrounded by a circumferential wall and, in this receptacle, a recess which is surrounded by an encircling collar portion which is aligned to be inclined at an angle to the longitudinal axis of the piston in such a way that at least one undercut is formed which is substantially completely filled in order to bring about the positive inter-engagement of material of a projection which is formed on the other part, the said free space being left between the outer circumferential surface of the collar portion and the inner circumferential surface of the circumferential wall.

BRIEF DESCRIPTION OF THE DRAWINGS

The invention is explained in detail below by reference to drawings which show an embodiment. In the drawings, which are each schematic longitudinal sections.

DESCRIPTION

Figure 1:
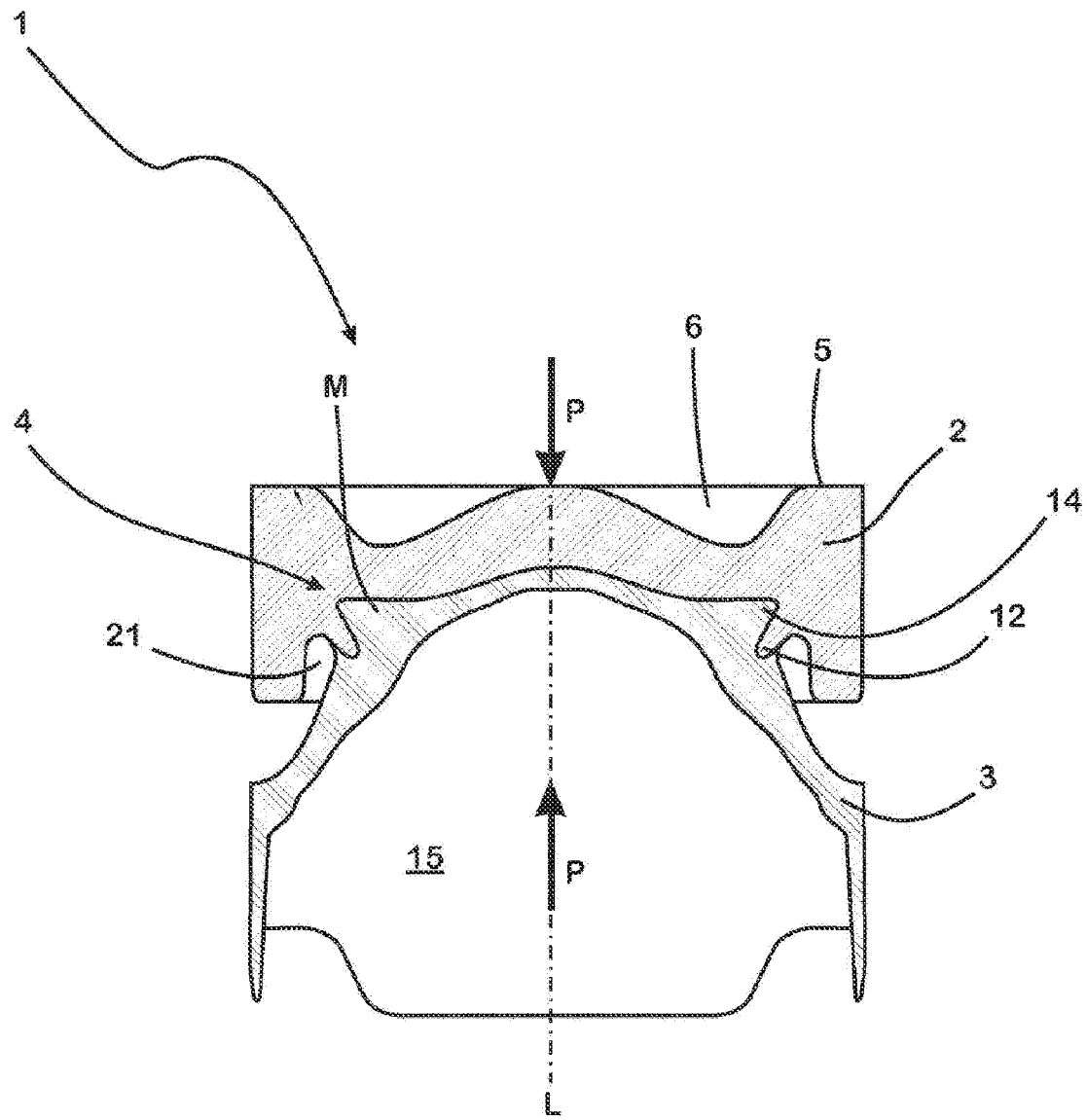
FIG. 1 shows a piston assembled from two parts.
Figure 2:
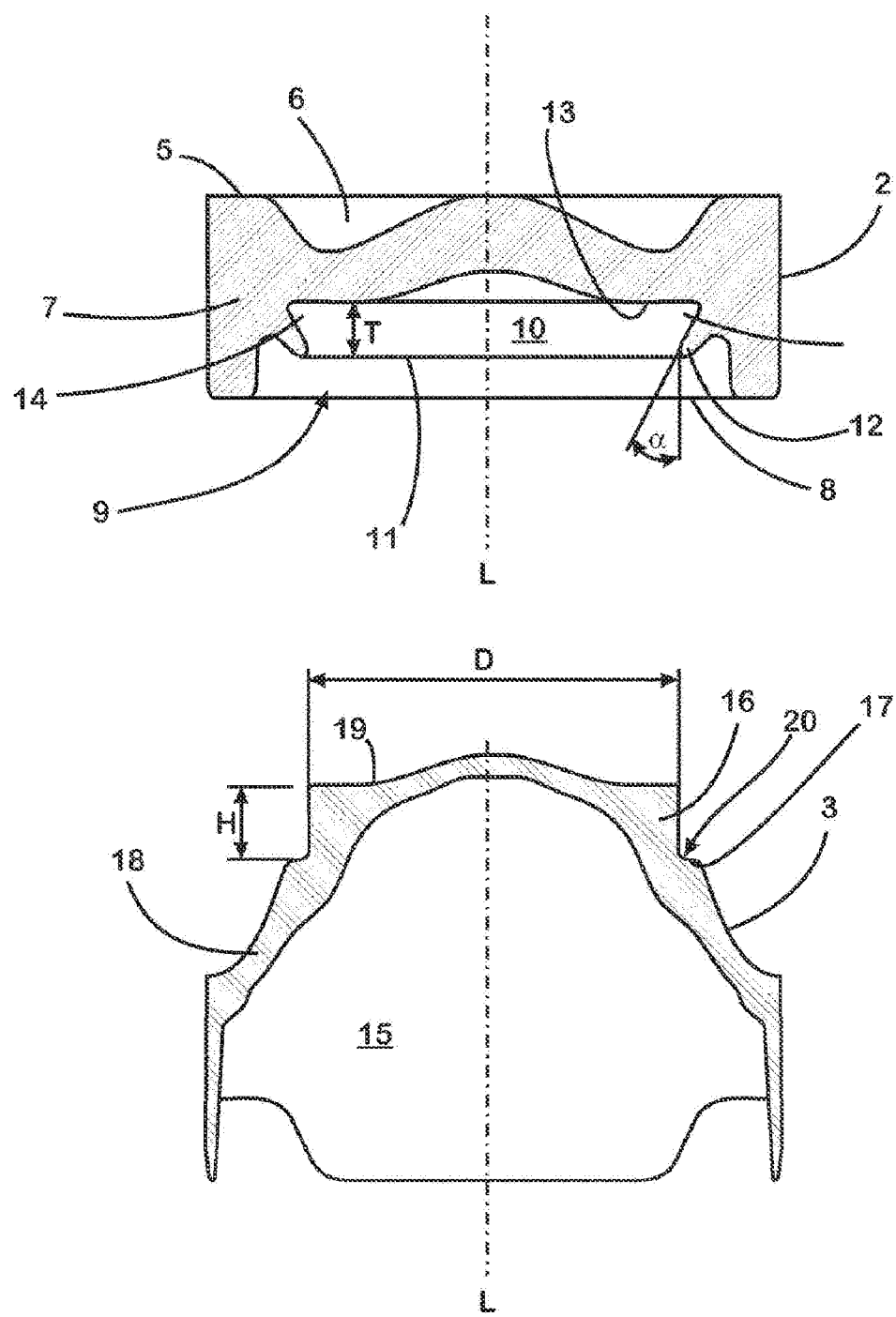
FIG. 2 shows the parts from which the piston shown in FIG. 1 is assembled.
Figure 3:
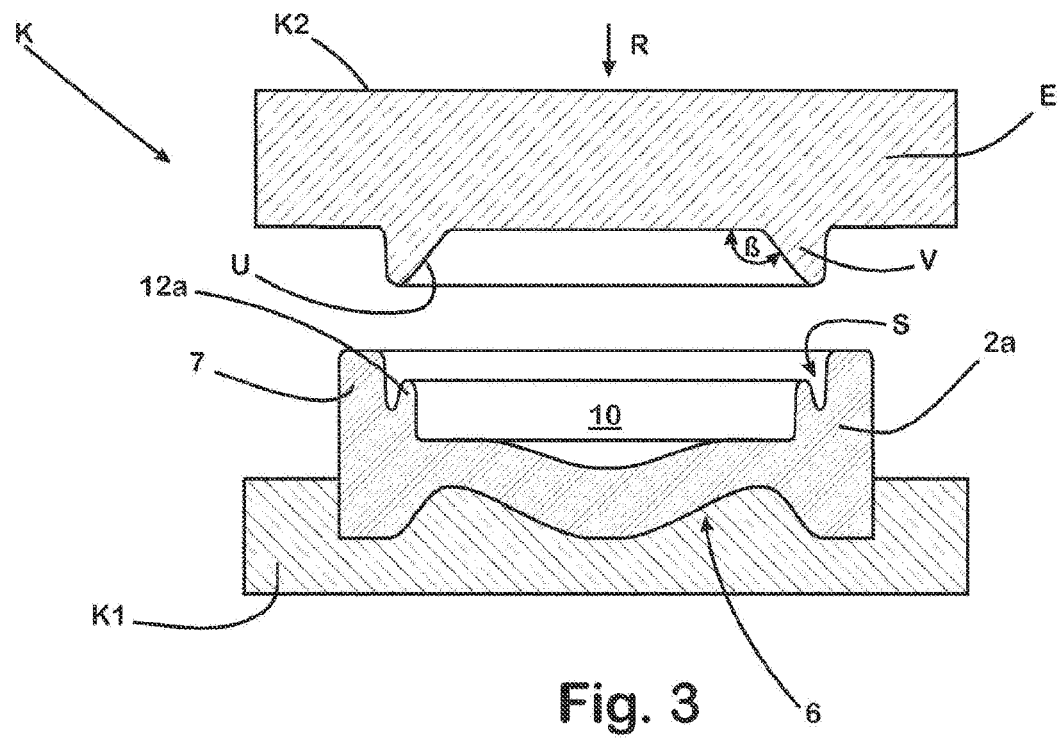
FIG. 3 and FIG. 4 show two of the operating steps which are performed when the first part of the piston is being produced.
Figure 4:
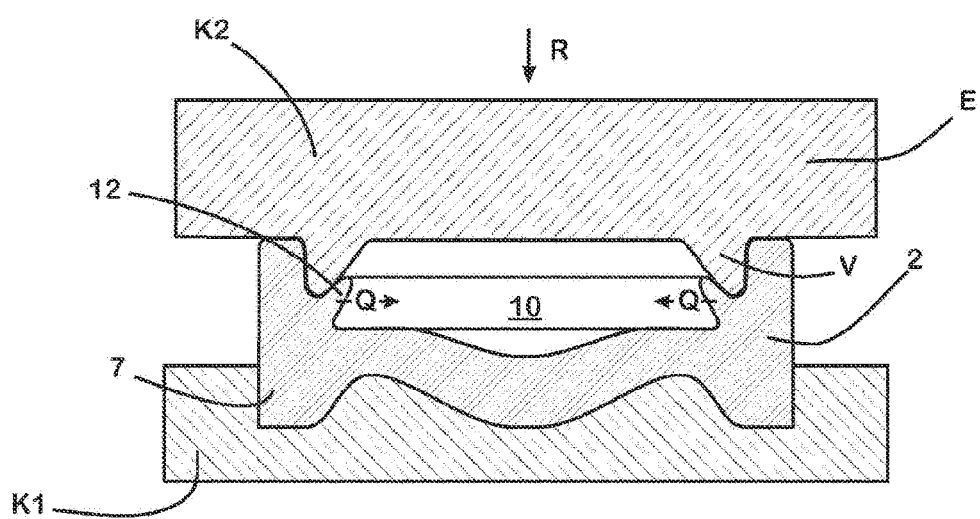

The piston 1 is assembled from a first, head part 2 of the piston which forms its head and a second, skirt part 3 of the piston which forms its skirt, which parts are connected together by positive fit and friction in the region of a joint zone 4 which is formed between the head part 2 of the piston and the skirt part 3 thereof. The head part 2 of the piston, the skirt part 3 of the piston and also the connection by friction and positive fit between the said two parts 2, 3 are produced in this case by hot-forging operations.

The head part 2 of the piston is produced from a steel blank by hot forging and is of a disc-like basic shape. Formed in that end-face 5 of the head part 2 of the piston which is associated in practical use with a combustion chamber (not shown) in an engine block (not shown likewise) is a dishing 6 for the combustion chamber. Following on from the end-face 5 there is a circumferential wall 7 which points in the direction of the skirt part 3 of the piston and which surrounds a receptacle 9 which is formed in that end-face 8 of the head part 2 of the piston which is associated with the skirt part 3 of the piston. The area at the bottom of the receptacle 9 is situated opposite the skirt part 3 of the piston and formed in it is a recess 10.

To produce the head part 2 of the piston, a preform (not shown) is first produced by simple upsetting from a steel blank (not shown likewise) which is heated to a forging temperature of approximately 1050° C., from which preform a piston-head blank 2a whose basic shape already corresponds to that of the head part 2 of the piston is then produced by means of a forging tool (also not shown). The recess 10, in its rough shape, has already been formed in this case in the piston-head blank 2a by means of the forging tool. At the same time, a non-undercut projection 12a has been formed on the piston-head blank 2a by the forging tool, which projection 12a surrounds the recess 10 in an annular form and is aligned in the opposite direction to that direction R in which the forging tool (not shown) acts. In the case of the piston-head blank 2a, the face of the inner wall of the recess 10 surrounded by the projection 12a is thus substantially cylindrical.

The calibration of the piston-head blank 2a then takes place in a further forging operating step. For this purpose, the piston-head blank 2a is placed in a two-piece calibrating tool K whose bottom part K1 associated with the end-face 5 of the piston-head blank 2a copies the finished shape of the dishing 6 for the combustion chamber in the head part 2 of the piston. The top part K2 of the calibrating tool K has, by contrast, on its side associated with the bottom part K1 of the tool, a projection V which extends round in an annular shape and which is carried by a plate E.

This projection V is so arranged that, when a piston-head blank 2a is lying on the bottom part K1 of the tool by its end-face 5, the said projection V points into the annular gap S which is present between the projection 12a and the circumferential wall 7 of the piston-head blank 2a. Starting from the free end of the projection V, the inner circumferential surface U thereof makes an obtuse angle $\beta$ of 115-120° with the underside of the plate E which carries the projection V, and the projection V is thus thicker in cross-section in the region of its root which adjoins the plate E than in the region of its free tip. At the same time, the outer circumferential surface of the projection V extends parallel to the inner surface of the circumferential wall 7.

When the calibrating tool K2 is lowered, the projection V engages in the annular gap S and its inner circumferential surface U impacts on the projection 12a on the piston-head blank 2a. In this way, a lateral force Q directed into the recess 10 is exerted on the projection 12a and the material of the projection 12a is displaced by this lateral force Q towards the recess 10.

As soon as the calibrating tool K2 has reached its lowest position, at which the tip of its projection V is seated against the bottom of the annular gap S, the projection 12a on the piston-head blank 2a has been shaped into the collar portion 12, which is now arranged in a position where it is inclined at an angle $\alpha$ of approximately 25-30° to the longitudinal axis L of the head part 2 of the piston.

In this way, the circular opening 11 of the recess 10 is surrounded by the encircling collar portion 12 which projects freely into the receptacle 9 and which, starting from the likewise circular floor area 13 of the recess 10, is aligned towards the longitudinal axis L of the head part 2 of the piston. In this way, the floor area 13 is larger than the area occupied by the opening 11. At the same time, an undercut 14 is formed in the region of the angle $\alpha$ which is made between the floor area 13 and the collar portion 12 which is arranged to be inclined, which undercut 14 cannot be obtained by a movement which only takes place parallel to the longitudinal axis L.

The skirt part 3 of the piston is likewise produced from a cylindrical steel blank by a plurality of hot-forging operations. For this purpose, the blank (not shown) was placed in the die of a forging apparatus (not shown likewise) in which, starting from one end-face of the blank and by means of a punch, a recess 15 in the skirt part 3 of the piston was then formed in a first forging step, which recess 15 is at the rear relative to the head part 2 of the piston in the fully assembled state. At the same time, a cylindrical projection 16 and a shoulder 17 which follows on without a step from projection 16 and encircles it were formed in the region of the other end-face of the blank, the shapes of which cylindrical projection 16 and shoulder 17 were preset by the die of the forging apparatus. The blank which had been pre-contoured in this way was then fully shaped in a second forging step. Apart from minor differences, the geometrical dimensions of the skirt part 3 of the piston which is obtained in this way correspond to the final size which is required and there are thus only small amounts of mechanical post-processing which have to be carried out (near net shape production).

On the skirt part 3 of the piston which is brought to a finished state in this way, the projection 16 which merges into the main portion 18 of the skirt part 3 of the piston without a step via the shoulder 17 is formed on the end-face situated opposite the recess 10. The main portion 18 comprises in essence an encircling wall in which are formed, amongst other things, the mounting openings (not visible here) for a connecting rod of the internal combustion engine for which the piston 1 is intended. Except that it is undersized, the diameter D of the projection 16 corresponds in this case to the diameter of the opening 11 of the recess 10 in the head part 2 of the piston, thus enabling the projection 16 to be introduced into the recess 10 in the head part 2 of the piston with a small amount of clearance. The transition from the projection 16 to the end-face 19 is formed to be continuous and free of any steps, i.e. is formed not to have a right-angled shoulder. This configuration makes it easier for the projection 16 to be introduced into the recess 10.

To simplify the introduction of the projection 16 to an additional degree and at the same time to make it possible for the head part 2 of the piston and the skirt part 3 thereof to be aligned with particular accuracy, the projection 16 may be formed to taper slightly, starting from the shoulder 17, in the direction of its free end-face 19.

The height H of the projection 16 is larger in this case than the depth T of the recess 10. This being so, the dimensions of the projection 16 on the skirt part 3 of the piston are thus matched, overall, to the dimensions of the recess 10 in the head part 2 of the piston, while allowing for a proportion Vk by which the volume of the projection 16 shrinks as it cools down after the skirt part 3 of the piston has been connected to the head part 2 thereof. Where the skirt part 3 and head part 2 of the piston are produced from steel and where that volume of the recess 10 which is to be filled by the material of the projection 16 is V1, this extra volume Vk works out as Vk=V1×0.014.

To ensure that there is a connection between the parts 2 and 3 which is lastingly solid under all conditions of temperature, the volume V2 of the projection 16 is therefore V2=V1+Vk, the additional volume Vk being formed particularly in the region of the projection 16, which projection 16 is associated with the collar portion 12 of the head part 2 of the piston after the joining of the skirt part 3 and head part 2 of the piston To connect the head part 2 of the piston to its skirt part 3, the skirt part 3 of the piston is first heated to a forging temperature of approximately 1050° C. while the head part 2 of the piston remains at room temperature.

The two parts 2, 3 are then positioned in suitably shaped receptacles in a compressing apparatus (not shown) in such a way that their longitudinal axes L are in line with one another and the projection 16 on the skirt part 3 of the piston and the recess 10 in the head part 2 of the piston are facing towards one another. The parts 2, 3 are then moved towards one another until the free end-face 19 butts against the floor area 13 of the recess 10. A compressive force P acting in the direction of the longitudinal axis L is then exerted on the head part 2 of the piston and/or on the skirt part 3 thereof. This force is sufficiently large for the material M of the projection 16 on the skirt part 3 of the piston, which has been heated to forging temperature, to flow into the space in the recess 10 which had, up till then, been free in the region of the undercut 14.

The compressing process is continued until the free edge of the collar portion 12 is seated in the hollow 20 at which the projection 16 merges into the adjoining shoulder 17 on the skirt part 3 of the piston. In this state, the steel material of the projection 16 completely fills the recess 10 including the undercut 14. The head part 2 of the piston is now connected to the skirt part 3 by positive fit by the material of the projection 16 which fits behind the collar portion 12.

The overfilling of the recess 10 which occurs as a result of the additional volume Vk of the projection 16 is compensated for by elastic deformation of the collar portion 12. The collar portion 12, having been deformed in this way, moves back towards its original shape as it cools down and the positive inter-engagement which is created by the filling of the recess 10 is thus supplemented by a frictional engagement which is caused by the interlocking and elastic return of the material of the projection 16 and of the collar portion 12, which latter is not, or not fully, deformed plastically.

Because the edge region of the collar portion 12 penetrates slightly into the material of the skirt part 3 of the piston, the head part 2 of the piston is, at the same time, supported on the shoulder 17 by means of the collar portion 12 in such a way that, even when the stresses in the region of the dishing 6 for the combustion chamber are adversely distributed, it is ensured that forces will be evenly transmitted from the head part 2 of the piston to the skirt part 3 thereof.

Between the outer circumferential surface of the collar portion 12 and the inner circumferential surface of the circumferential wall 7 there is left, in this case, an encircling free space 21 of a channel-like form which is available in practical use to dissipate the heat from the head part 2 of the piston, particularly in the region of the highly stressed circumferential wall 7.

For the head part 2 of the piston to be connected to its skirt part 3, it is, basically, possible for both parts to be heated to hot-forging temperature. It is however enough for only the skirt part 3 of the piston, or even only the projection 16 on the skirt part 3 of the piston, to be heated to hot-forging temperature while no deliberate increase is made in the temperature of the head part 2 of the piston. Regardless of whether the projection 16 is heated on its own or together with the entire skirt part 3 of the piston, the recess 10 in the head part of the piston acts in this case as a forming die for the reshaping of the projection 16 on the skirt part 3 of the piston which is required to connect the skirt part 3 and head part 2 of the piston together. The head part 2 of the piston can then be left in the bottom part K1 of the tool in this reshaping step. In this way, the bottom part K1 of the tool can be used not only to calibrate the blank 2*a* of the head part 2 of the piston but also as a tool for connecting the head part 2 of the piston to its skirt part 3. The tooling costs can be reduced in this way and there is also no need for the forging tool to be changed between the individual operations, which, all in all, has a beneficial effect on the costs of production.

REFERENCE NUMERALS

1 Piston
2 Head part of piston
2*a* Piston-head blank
3 Skirt part of piston
4 Joint zone
5 End-face of the head part 2 of the piston and of the piston-head blank 2*a*
6 Dishing for combustion chamber
7 Circumferential wall of the head part 2 of the piston and of the piston-head blank 2*a*
8 Second end-face of the head part 2 of the piston
9 Receptacle in the head part 2 of the piston
10 Recess
11 Opening of the recess 10
12 Collar portion
12*a* Projection of the piston-head blank 2*a*
13 Floor area of the recess 10
14 Undercut
15 Recess at rear of the skirt part 3 of the piston
16 Projection
17 Shoulder
18 Main portion of the skirt part 3 of the piston
19 End-face of the projection 16
20 Groove at the transition from the projection 16 to the shoulder 17
21 Free space
α, β Angles
D Diameter of the projection 16
E Plate
H Height of the projection 16
K1 Bottom part of calibrating tool K
K2 Top part of calibrating tool K
K Calibrating tool
L Longitudinal axis of the piston 1 and of the parts 2, 3
M Material of the projection 16
P Compressive force
R Direction in which the forging tool acts
T Depth of the recess 10
V Projection on part K1 of the tool
S Annular gap
U Inner circumferential surface of the projection V
Q Force

The invention claimed is:

1. Method for producing a piston for internal combustion engines in which
a first part is pre-fabricated by hot forging and a recess which has at least one undercut is formed in the first part during pre-fabrication by forming on the first part, by means of a shaping tool, a projection which is directed substantially in an opposite direction to that in which the shaping tool acts, to which projection a lateral force which is directed in the direction of a receptacle is then applied to form the at least one undercut, a second part is pre-fabricated by hot forging and a second projection is formed on the second part whose dimensions are matched to the dimensions of the recess in such a way that the second projection can be slid freely into the recess of the first part and a volume of the second projection is at least equal to a volume of the recess, the first and second parts are joined together so that the second projection of the second part engages in the recess of the first part, and a compressive force is applied to the first and second parts which have been joined together which is sufficiently large and so aligned that material of the second projection of the second part flows into the recess in the first part and completely fills it to connect the first and second parts by positive fit.

2. Method according to claim 1, wherein the recess and the second projection are formed at respective end-faces of the first and second parts.

3. Method according to claim 1, wherein, the first part forms a head of the piston and the second part forms the skirt of the piston.

4. Method according to claim 3, wherein the second projection is associated with the skirt of the piston and the recess with the head of the piston.

5. Method according to claim 1, wherein the recess has a circular opening.

6. Method according to claim 1, wherein an opening of the recess is of an area which is smaller than a projected floor area of the recess, which projected floor area is situated opposite the opening.

7. Method according to claim 6, wherein, to form the at least one undercut, at least a portion or portions of a circumferential surface surrounding the recess are aligned, starting from the floor area, to be inclined towards area of the opening.

8. Method according to claim 1, wherein, when force is applied to make the positive fit connection between the first and second parts, the second part which is provided with the second projection is heated to forging temperature at least in the region of the second projection.

9. Method according to claim 1, wherein the direction in which the compressive force acts is aligned to be co-axial with a longitudinal direction of the second projection and the recess.

10. Method according to claim 1, wherein the volume of the second projection of the second part is of a size such that, taking into account thermal expansion of the first and second parts, material of the second projection completely fills the recess of the first part even in a cooled-down state.

11. Method according to claim 10, wherein the shape of the circumference of the second projection on the second part is matched to the shape of the opening of the recess in the first part in such a way that the second projection is able to be slid into the opening when it is in the a heated state where it is heated to hot-forging temperature, and wherein the height of the second projection is greater than the depth of the recess.

12. Piston for internal combustion engines, produced from a first part and a second part produced by hot forging which are connected together by positive fit, wherein a receptacle is formed in the first part which is surrounded by a circumferential wall and, in the receptacle, a recess which is surrounded by an encircling collar portion which is aligned to be inclined at an angle to a longitudinal axis of the piston in such a way that at least one undercut is formed which is substantially completely filled in order to bring about the positive fit of material of a projection which is formed on the second part, an encircling free space being left between an outer circumferential surface of the collar portion and an inner circumferential surface of the circumferential wall.

13. Piston according to claim 12, wherein the recess and the projection are formed at respective end-faces of the first and second parts.

14. Piston according to claim 12, wherein the first part forms a head of the piston and the second part forms a skirt of the piston.

15. Piston according to claim 14, wherein the projection is associated with the skirt of the piston and the recess with the head of the piston.

16. Piston according to claim 12, wherein the recess has a circular opening.

17. Piston according to claim 12, wherein a shoulder is formed at a transition from the projection to a main portion of the second part.

18. Piston according to claim 12, wherein material of the second part which is provided with the projection surrounds at least a portion or portions of the collar portion.

19. Piston according to claim 12, wherein the first part is composed of a first material and the second part is composed of a second material which is different from the first material.

* * * * *